United States Patent
Sihn et al.

(10) Patent No.: US 9,250,968 B2
(45) Date of Patent: Feb. 2, 2016

(54) METHOD AND MEMORY MANAGER FOR MANAGING A MEMORY IN A MULTI-PROCESSING ENVIRONMENT

(75) Inventors: Kue-hwan Sihn, Suwon-si (KR); Hyun-ki Baik, Seongnam-si (KR); Jong-tae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 12/566,752

(22) Filed: Sep. 25, 2009

(65) Prior Publication Data

US 2010/0083273 A1 Apr. 1, 2010

(30) Foreign Application Priority Data

Sep. 26, 2008 (KR) .................. 10-2008-0094760

(51) Int. Cl.
*G06F 9/46* (2006.01)
*G06F 9/50* (2006.01)

(52) U.S. Cl.
CPC ............ *G06F 9/5016* (2013.01); *G06F 9/5027* (2013.01); *G06F 2209/504* (2013.01); *G06F 2209/508* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 6,230,183 B1 * | 5/2001 | Yocom et al. | 718/105 |
| 6,389,489 B1 | 5/2002 | Stone et al. | |
| 6,598,086 B1 | 7/2003 | Bell, Jr. et al. | |
| 6,604,145 B1 | 8/2003 | Bell, Jr. et al. | |
| 6,704,799 B1 | 3/2004 | Kindorf et al. | |
| 7,243,354 B1 | 7/2007 | Chhabra et al. | |
| 2002/0110111 A1 * | 8/2002 | Couture | 370/352 |
| 2005/0091657 A1 * | 4/2005 | Priem | 718/104 |
| 2006/0294524 A1 * | 12/2006 | Vega | 718/104 |
| 2007/0174411 A1 | 7/2007 | Brokenshire et al. | |
| 2007/0226449 A1 | 9/2007 | Akimoto | |
| 2008/0066066 A1 | 3/2008 | MacPherson | |
| 2008/0109814 A1 | 5/2008 | Park | |

FOREIGN PATENT DOCUMENTS

| | | |
|---|---|---|
| EP | 1 089 173 | 4/2001 |
| JP | 6-175984 A | 6/1994 |
| JP | 07-200496 | 8/1995 |
| JP | 9-101902 A | 4/1997 |
| JP | 2007-188212 A | 7/2007 |
| KR | 10-2008-0041047 | 5/2008 |

(Continued)

OTHER PUBLICATIONS

Suleman, M. Aater, et al., "Feedback-Driven Threading: Power-Efficient and High-Performance Execution of Multi-threaded Workloads on CMPs," Seattle, Washington, USA, 2008, pp. 277-286.

(Continued)

*Primary Examiner* — Gregory A Kessler
(74) *Attorney, Agent, or Firm* — NSIP Law

(57) ABSTRACT

A memory managing method and memory manager for a multi processing environment are provided. The memory manager adjusts the number of processors assigned to a consumer process and/or an assignment unit size of data to be consumed by the consumer process based on a condition of a shared queue which is shared by a producer process producing data and the consumer process consuming the data.

35 Claims, 4 Drawing Sheets

(56) References Cited

FOREIGN PATENT DOCUMENTS

| WO | WO 2006/092807 | 9/2006 |
| WO | WO 2007/085522 | 8/2007 |

OTHER PUBLICATIONS

European Search Report issued on Apr. 1, 2010, in corresponding European Application No. 09171423.8 (7 pages).

Japanese Office Action issued Nov. 19, 2013 in counterpart Japanese Patent Application No. 2009-223236. (6 pages including English translation).

Simonis, Helmut et al. "Modelling producer/consumer constraints," *Principles and Practice of Constraint Programming—CP'95*. Springer Berlin Heidelberg, 1995, (14 pages).

Korean Office Action issued Feb. 21, 2014 in counterpart Korean Patent Application No. 10-2009-0091306. (18 pages including English translation).

\* cited by examiner

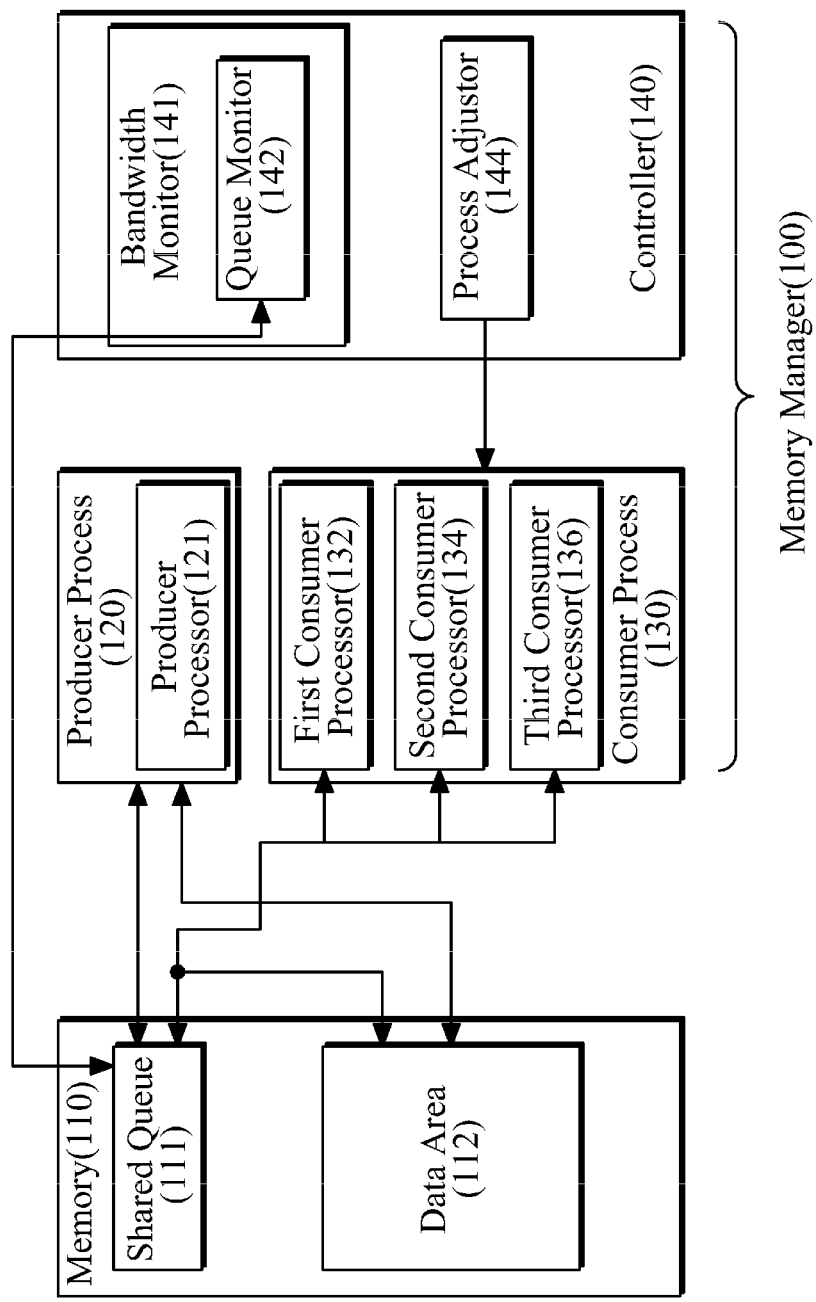

METHOD AND MEMORY MANAGER FOR MANAGING A MEMORY IN A MULTI-PROCESSING ENVIRONMENT

CROSS-REFERENCE TO RELATED APPLICATION

This application claims the benefit under 35 U.S.C. §119(a) of a Korean Patent Application No. 10-2008-0094760, filed Sep. 26, 2008, the disclosure of which is incorporated herein by reference in its entirety for all purposes.

BACKGROUND

1. Field

The following description relates to processing technology and, more particularly, to a method and memory manager for managing a memory in a multi-processing environment.

2. Description of the Related Art

In a multi-processing environment where a multi-core or multiprocessor exists, processes or threads assigned to the respective cores or processors share memory, such as queues, and process jobs stored in the queues.

In such a multi-processing environment, multiple processes may be used to perform a certain task. Examples of the processes include a producer process which produces data while performing a task, and a consumer process which consumes data while performing a task. For example, in a case of a video decoder which is implemented with a multiprocessor, variable length decoding corresponds to a producer process and macroblock processing corresponds to a consumer process.

In an environment where both the producer process and the consumer process are performed at the same time, to improve the overall work performance, a memory bandwidth shared by the producer process and the consumer process should be efficiently used.

In a traditional multi-processing environment, the number of processors assigned to consumer processes is increased to increase the parallel processing degree and thus to improve the work performance. However, in this set up, the increased number of processors assigned to the consumer processes can use up the memory bandwidth, and other processors may not have the chance to access the memory, thereby decreasing the overall work performance. The number of processors assigned to processes may be predetermined or limited to a predetermined number. In this case, the overall work performance may decrease since a predetermined number of processors are used without taking work conditions into account. Further, other traditional methods have been known to require alteration to memory bus architecture.

SUMMARY

In one general aspect, a memory manager in a multi processing environment, includes one or more producer processors assignable to produce jobs, one or more consumer processors assignable to consume the produced jobs, and a controller to manage the one or more consumer processors based on a condition of a bandwidth between a memory and the processors.

The controller may include a bandwidth monitor which checks the condition of the bandwidth between the memory and the processors.

The bandwidth monitor may include a queue monitor which checks a length of a shared queue shared by the processors, determined according to the number of jobs to be processed in the shared queue.

The bandwidth monitor may include a queue monitor which calculates a moving average of a shared queue shared by the processors, determined according to the number and specific time of jobs to be processed in the shared queue.

The controller may adjust the number of processors assigned to consume the produced jobs based on the condition of the bandwidth.

The controller may include a process adjustor which increases the number of processors assigned to consume the produced jobs if a length of a shared queue is greater than a predetermined upper limit, and decreases the number of processors assigned to consume the produced jobs if the length of the shared queue is less than a predetermined lower limit.

The controller may include a process adjustor which decreases an assignment unit size of data to be consumed by the one or more consumer processors if a length of a shared queue is greater than a predetermined upper limit, and increases the assignment unit size of data to be consumed by the one or more consumer processors if the length of the shared queue is less than a predetermined lower limit.

The controller may include a process adjustor which increases the number of processors assigned to consume the produced jobs if a length of a shared queue continues to increase for a given period of time, and decreases the number of processors assigned to consume the produced jobs if the length of the shared queue continues to decrease for a given period of time.

The controller may include a process adjustor which decreases an assignment unit size of data to be consumed by the one or more consumer processors if a length of a shared queue continues to increase for a given period of time, and increases the assignment unit size of data to be consumed by the one or more consumer processors if the length of the shared queue continues to decrease for a given period of time.

In another general aspect, a memory managing method in a multi processing environment comprising a producer process, a consumer process and a memory, includes checking a condition of a bandwidth between the memory and one or more processors assigned to the producer process and consumer process, and managing the consumer process based on the condition of the bandwidth.

The checking of the condition of the bandwidth may include determining a length of a shared queue shared by the producer process and consumer process according to the number of jobs to be processed in the shared queue.

The managing of the consumer process may include adjusting the number of processors assigned to the consumer process based on the condition of the bandwidth.

The adjusting the number of processors may include increasing the number of processors assigned to the consumer process if a length of a shared queue is greater than a predetermined upper limit, and decreasing the number of processors assigned to the consumer process if the length of the shared queue is less than a predetermined lower limit.

The adjusting the number of processors may include increasing the number of processors assigned to the consumer process if a length of a shared queue continues to increase for a given period of time, and decreasing the number of processors assigned to the consumer process if the length of the shared queue continues to decrease for a given period of time.

The managing of the consumer process may include decreasing an assignment unit size of data to be consumed by the consumer process if a length of a shared queue is greater than a predetermined upper limit, and increasing the assignment unit size of data to be consumed by the consumer process if the length of the shared queue is less than a predetermined lower limit.

The managing of the consumer process may include decreasing an assignment unit size of data to be consumed by the consumer process if a length of a shared queue continues to increase for a given period of time, and increasing the assignment unit size of data to be consumed by the consumer process if the length of the shared queue continues to decrease for a given period of time.

The checking the condition of the bandwidth may includes determining of a variation in length of a shared queue including calculating a moving average of the shared queue.

In still another general aspect, a computing device for use in a multi processing environment, includes a shared queue shared by a first process to produce jobs and a second process to consume the jobs produced by the first process, and a controller to manage the second process based on a condition of the shared queue.

The controller may adjust the number of processors assigned to the second process based on the condition of the shared queue.

The controller may include a queue monitor which checks a length of the shared queue determined according to the number of jobs to be processed in the shared queue.

The controller may further include a process adjustor which increases the number of processors assigned to the second process if the length of the shared queue is greater than a predetermined upper limit, and decreases the number of processors assigned to the second process if the length of the shared queue is less than a predetermined lower limit.

The controller may further include a process adjustor which decreases an assignment unit size of data to be consumed by the second process if the length of the shared queue is greater than a predetermined upper limit, and increases the assignment unit size of data to be consumed by the second process if the length of the shared queue is less than a predetermined lower limit.

The controller may include a queue monitor which calculates a moving average of the shared queue determined according to the number and specific time of jobs to be processed in the shared queue.

The controller may further include a process adjustor which increases the number of processors assigned to the second process if a length of the shared queue continues to increase for a given period of time, and decreases the number of processors assigned to the second process if the length of the shared queue continues to decrease for a given period of time.

The controller may further include a process adjustor which decreases an assignment unit size of data to be consumed by the second process if a length of the shared queue continues to increase for a given period of time, and increases the assignment unit size of data to be consumed by the second process if the length of the shared queue continues to decrease for a given period of time.

In yet another general aspect, a computing device for use in a multi processing environment, includes a shared queue which is shared by a first process and a second process, wherein the first process produces data and entries of the shared queue are jobs to be processed by the second process, and a controller which adaptively adjusts the number of processors assigned to the second process and/or an assignment unit size of data to be processed by the second process based on a condition of the shared queue.

The controller may include a queue monitor which checks a length of the shared queue determined according to the number of jobs to be processed in the shared queue, and a process adjustor which increases the number of processors assigned to the second process and/or decreases the assignment unit size of data to be processed by the second process if the length of the shared queue is greater than a predetermined upper limit, and decreases the number of processors assigned to the second process and/or increases the assignment unit size of data to be processed by the second process if the length of the shared queue is less than a predetermined lower limit.

The controller may calculate a moving average of the shared queue, and increase the number of processors assigned to the second process and/or decreases the assignment unit size of data to be processed by the second process if a variation in length of the shared queue indicates an increasing trend, and decrease the number of processors assigned to the second process and/or increases the assignment unit size of data to be processed by the second process if the variation in length of the shared queue indicates a decreasing trend.

The controller may adjust the number of processors assigned to the second process by placing one or more processors in a sleep mode.

In still yet another general aspect, there is provided a computer-readable storage medium storing a program to manage a memory in a multi processing environment, comprising instructions to cause a computer to determine a length of and/or a variation in length of a shared queue which is shared by a first process and a second process, wherein the first process produces data and entries of the shared queue are jobs to be processed by the second process, and manage the second process based on a condition of the length of and/or the variation in length of the shared queue.

Other features and aspects will be apparent from the following description, the drawings, and the claims.

BRIEF DESCRIPTION OF THE DRAWINGS

FIG. 1 is a block diagram illustrating an exemplary computing device including a memory and a memory manager.

Throughout the drawings and the detailed description, unless otherwise described, the same drawing reference numbers refer to the same elements, features, and structures. The relative size and depiction of these elements may be exaggerated for clarity, illustration, and convenience.

DETAILED DESCRIPTION

Figure 2A:
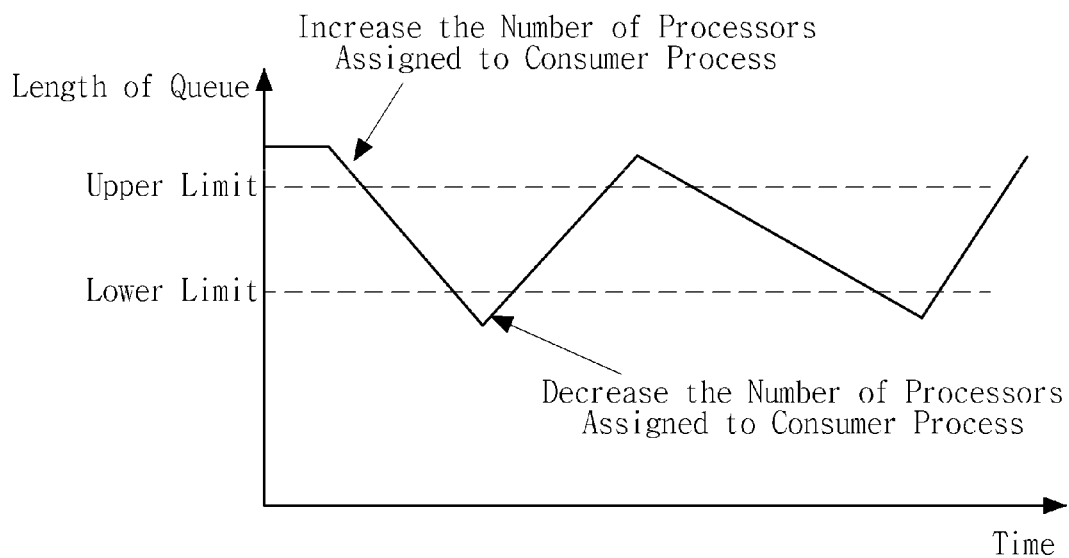
FIGS. 2A and 2B illustrate how the number of processors assigned to a consumer process is adjusted according to a length of a shared queue.

The following detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions may be omitted to increased clarity and conciseness.

FIG. 1 illustrates an exemplary computing device including a memory 110 and a memory manager 100. The memory 110 includes a shared queue 111 and a data area 112. The memory manager 100 accesses the memory 110 and includes a controller 140 and a plurality of processors 121, 132, 134 and 136. The controller 140 may be implemented on one or more processors. The controller 140 includes a bandwidth monitor 141 and a process adjustor 144.

The shared queue 111 is shared by a producer process 120, which produces jobs and data for the jobs, and a consumer process 130 which consumes the data by processing the jobs. A job, for example, a description about the job to be processed by the consumer process 130, produced by the producer process 120 may be stored in the shared queue 111 and data for the job to be processed by the consumer process 130 may be stored in the data area 112 of the memory 110. The consumer process 130 may read and process the data for the job in the data area 112 of the memory 110 according to the job stored in shared queue 111. The producer process 120 queues the job in the shared queue 111. The consumer process 130 reads the job from the shared queue 111 and processes the data from the data area 112 according to the job description. The length of the shared queue 111 thus varies depending on the number of jobs produced by the producer process 120 and the number of jobs consumed by the consumer process 130.

For example, in the event the producer process 120 produces ten (10) jobs and the consumer process 130 consumes four (4) out of ten (10) jobs, the length of the shared queue 111 is six (6). The length of the shared queue 111 also varies depending on the rate of job production of the producer process 120 and the rate of job consumption of the consumer process 130. The producer process 120 may be assigned a producer processor 121. The consumer process 130 may be assigned multiple consumer processors 132, 134 and 136.

The controller 140 controls the consumer process 130 based on conditions of the bandwidth between the memory 110 and the processors 121, 132, 134 and 136.

In one example, the controller 140 may adjust the number of processors assigned to the consumer process 130 based on the conditions of the memory bandwidth between the memory 110 and the processors 121, 132, 134 and 136. The condition of the memory bandwidth can be checked based on the condition of the shared queue 111.

For example, if the bandwidth is under-saturated by assigning relatively fewer consumer processors to the consumer process 130, the length of the shared queue 111 becomes longer and the controller 140 may then increase the number of processors assigned to the consumer process 130. If the bandwidth is over-saturated, for example, by assigning relatively a greater number of processors to the consumer process 130, the length of the shared queue 111 becomes shorter and the controller 140 may then decrease the number of processors assigned to the consumer process 130. In other words, the number of processors assigned to the consumer process 130 may be increased as more jobs to be processed are queued in the shared queue 111.

To perform this task of increasing or decreasing the number of processors assigned to the consumer process 130, the controller 140 may include a bandwidth monitor 141 and a process adjustor 144. The bandwidth monitor 141 may include a queue monitor 142. The bandwidth monitor 141 checks the condition of the bandwidth between the memory 110 and processors based on the length of the shared queue 111 which may be determined by the queue monitor 142. The process adjustor 144 increases the number of processors assigned to the consumer process 130 if the length of the shared queue 111 exceeds, for example, a predetermined upper limit, and decreases the number of processors assigned to the consumer process 130 if the length of the shared queue 111 is less than, for example, a predetermined lower limit. The upper limit may be set as a value between about 5% and about 30% above a value indicating an optimal work performance obtained from testing various workloads. Similarly, the lower limit may be set as a value between about 5% and about 30% below a value indicating an optimal work performance obtained from testing various workloads. Accordingly, it is possible to reduce the power consumption by using only a determined number of processors for the consumer process 130 and maintaining the remaining processors in, for example, a sleep mode.

As another example, the number of processors assigned to the consumer process 130 may be adjusted with a variation in length of the shared queue 111. In other words, the queue monitor 142 calculates a moving average of the shared queue 111 to measure a variation in length of the shared queue 111. The number of processors assigned to the consumer process 130 is increased if the variation, for example, continuously increases for a given period of time, while the number of processors assigned to the consumer process 130 is decreased if the variation, for example, continuously decreases for a given period of time.

In another example, the controller 140 may adjust an assignment unit size of data consumed by the consumer process 130 based on the conditions of the bandwidth between the memory 110 and processors 121, 132, 134 and 136. The condition of the memory bandwidth can be checked based on the condition of the shared queue 111. The adjustment of the assignment unit size may be performed in addition to or in place of the adjustment of the number of processors describe above.

For example, if the length of the shared queue 111 becomes longer, the controller 140 may make an assignment unit size of data to be sent to the consumer process 130 smaller. If the length of the shared queue 111 becomes shorter, the controller 140 may make the assignment unit size of data to be sent to the consumer process 130 larger. In this example, the consumer process 130 may not read and process data until the data is accumulated to a predetermined assignment unit size. In other words, the consumer process 130 may be controlled to process data as soon as the data is queued in the shared queue 111, or to not process data until the data is accumulated to a predetermined assignment unit size.

The queue monitor 142 may check the length of the shared queue 111 determined by the number of jobs to be processed in the shared queue 111. The process adjustor 144 may decrease the assignment unit size of data to be consumed by the consumer process 130 if the length of the shared queue is greater than, for example, a predetermined upper limit, and may increase the assignment unit size of data to be consumed by the consumer process 130 if the length of the shared queue is less than, for example, a predetermined lower limit.

This way, for example, processors assigned to the consumer process 130 may be put in a sleep mode until the data accumulated in the data area 112 reaches a current assignment unit size. Accordingly, the producer process 120 may more easily access a memory and the power consumption may be reduced. Also, since whether the consumer process 130 is kept in a sleep mode can be determined by adjusting the assignment unit size, the producer process 120 may more easily access the memory.

As another example, the assignment unit size of data to be consumed by the consumer process 130 may be adjusted with a variation in length of the shared queue 111. In this case, the process adjustor 144 calculates a moving average of the shared queue 111. The process adjustor 144 may decrease the assignment unit size of data to be consumed by the consumer process 130 if, for example, a variation in length of the shared queue 111 continues to increase for a given period of time.

The process adjustor 144 may increase the assignment unit size of data to be consumed by the consumer process 130 if, for example, the variation in length of the shared queue 111 continues to decrease for a given period of time.

Figure 2B:
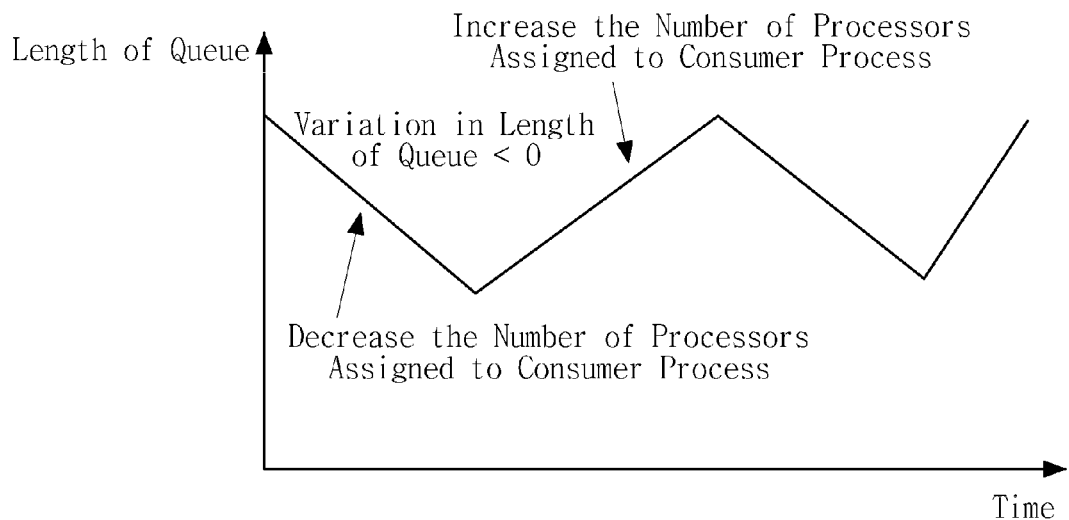

FIGS. 2A and 2B illustrate how the number of processors assigned to a consumer process is adjusted according to a length of a shared queue.

Referring to FIGS. 1 and 2A, in one implementation, if the length of the shared queue 111 is greater than an upper limit, which means, for example, that the bandwidth between a memory and processors is under-saturated by assigning fewer consumer processors to the consumer process 130. Therefore the controller 140 may increase the number of processors assigned to the consumer process 130. If the length of the shared queue 111 decreases below a lower limit, which means, for example, that the bandwidth between a memory and processors is over-saturated by assigning too many processors to the consumer process 130. Therefore the controller 140 may decrease the number of processors assigned to the consumer process 130. In this manner, the number of the processors assigned to the consumer process 130 may be adjusted, for example, to an optimal number.

Referring to FIGS. 1 and 2B, in another implementation, if a variation in length of the shared queue 111 is less than zero (0), for example, the length of the shared queue 111 continues to decrease for a given period of time as jobs consumed by the consumer process 130 is greater than jobs produced by the producer process 120, the number of processors assigned to the consumer process 130 is decreased. If the length of the shared queue 111 continues to increase for a given period of time since jobs consumed by the consumer process 130 is less than jobs produced by the producer process 120, the number of processors assigned to the consumer process 130 is increased.

Figure 3:
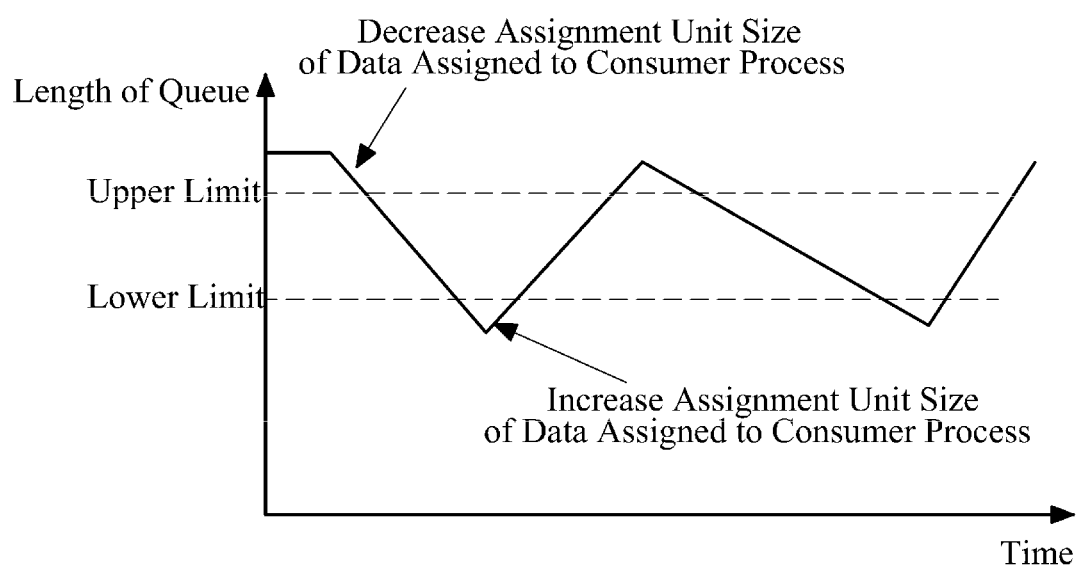
FIG. 3 illustrates how an assignment unit size of data assigned to a consumer process is adjusted according to a length of a shared queue.

FIG. 3 illustrates how the assignment unit size of data assigned to a consumer process may be adjusted according to a length of a shared queue.

Referring to FIGS. 1 and 3, in one implementation, if a length of the shared queue 111 is greater than an upper limit, the assignment unit size of data to be assigned to the consumer process 130 is decreased. When the length decreases below a lower limit, the assignment unit size of data to be assigned to the consumer process 130 is increased. In this manner, the assignment unit size of data to be assigned to the consumer process 130 may be adjusted.

Figure 4:
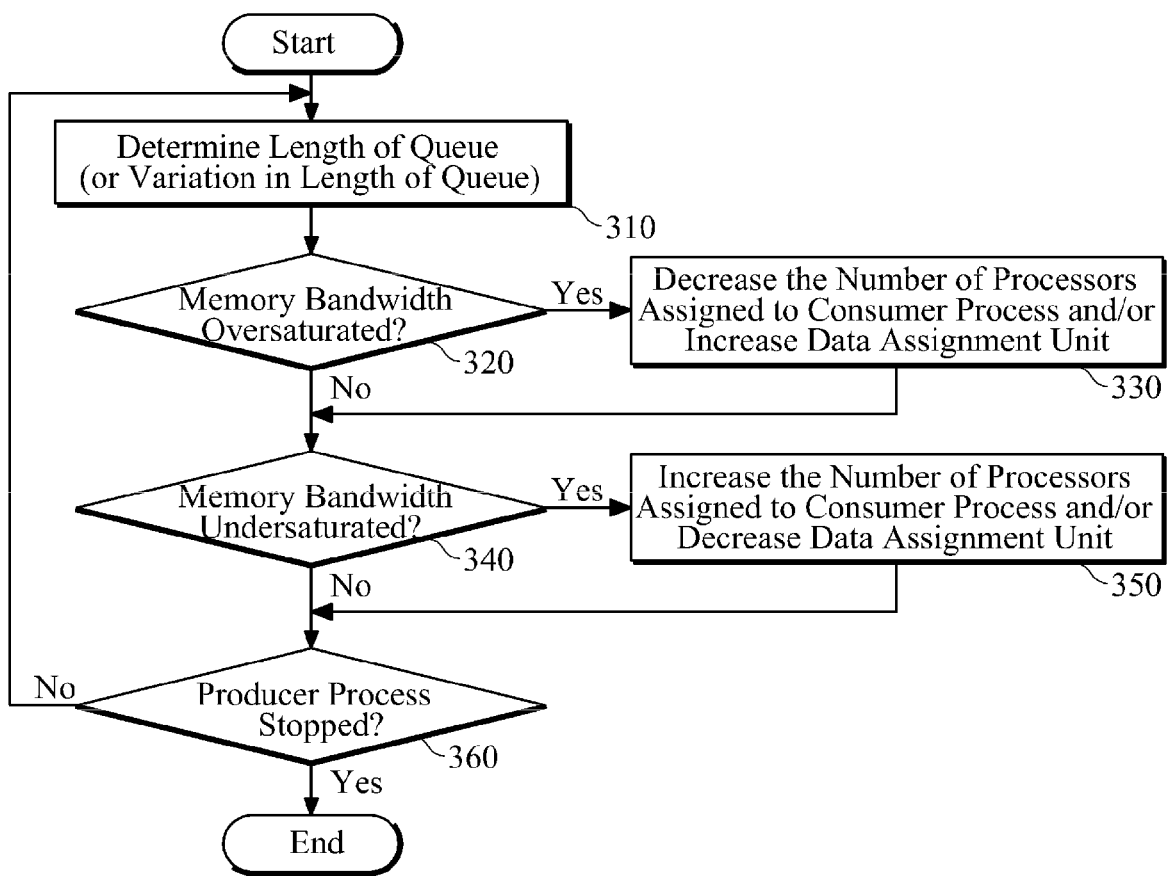
FIG. 4 is a flowchart of an exemplary method for managing a memory.

FIG. 4 is a flowchart of an exemplary method of managing a memory. The method may be performed by, for example, the memory manager illustrated in FIG. 1.

Referring also to FIG. 1, the length of or a variation in length of the shared queue 111 is determined (310).

The consumer process 130 may be managed based on the condition of the shared queue 111. If a memory bandwidth is occupied by the consumer process 130 such that the producer process 120 can no longer produce jobs at the consuming pace, fewer entries remain in the shared queue 111 (320).

This over-saturated condition may be determined if, for example, the length of the shared queue 111 is less than a predetermined lower limit, and the number of the processors assigned to the consumer process 130 is decreased and/or the assignment unit size of data to be consumed by the consumer process 130 is increased (330). As another example, as described above, when a variation in length of the shared queue 111 is negative for a given period of time, the number of the processors assigned to the consumer process 130 may be decreased and/or the assignment unit size of data to be consumed by the consumer process 130 may be increased.

If the memory bandwidth is under-saturated by assigning fewer processors to the consumer process 130, more entries remain in the shared queue (340). This under-saturated condition can be determined by examining the length of the shared queue 111. If the length of the shared queue 111 is greater than a predetermined upper limit, then it may be that the producer processes' pace exceed that of the consumer processes and that there is a room in the memory bandwidth for consumer processors. Accordingly, the number of processors assigned to the consumer process 130 is increased and/or the assignment unit size of data to be consumed by the consumer process 130 is decreased (350). As another example, when a variation in length of the shared queue is positive for a given period of time, the number of processors assigned to the consumer process 130 may be increased and/or the assignment unit size of data to be consumed by the consumer process 130 may be decreased.

It is determined whether the producer process 120 has stopped operating (360). If the producer process 120 has stopped operating, the current managing process ends. If not stopped, the managing process may return to determine the condition of the shared queue 111 (310).

According to example(s) described above, provided are an exemplary method and memory manager for managing a memory in a multi processing environment such as for a multi-core processor or multiprocessor.

According to example(s) described above, when there is not enough memory bandwidth for a producer process, access to a shared memory may be limited with respect to a consumer process, so as to enable multi processing to be more efficiently performed in a multi-core or multiprocessor environment.

Furthermore, the power consumption may be reduced by putting unnecessary processors in a sleep mode. In addition, since the assignment or allocation of processors is adaptively adjusted according to workload or properties of data used, presetting the number of processors or the assigned amount of data in advance of performing work, for example, profiling, may be avoided.

As a non-exhaustive illustration only, teachings provided herein may be applied to a decoder, for example, a video decoder, and a producer-consumer processing device operating on a multi-core processor or multiprocessor, for example, a system for performing producer-consumer parallel processes in multiple threads on the multi-core processor or multiprocessor. Again as a non-exhaustive illustration only, the teachings provided herein may be applied to a device for writing queue entry to perform processes on variable length decoding (VLD) on a multi-core processor, and for performing motion compensation (MC), inverse transformation (IT), inverse quantization (IQ), and the like by a multiprocessor.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory manager in a multi-processing environment, comprising:
   one or more producer processors configured to produce jobs;
   one or more consumer processors configured to consume the produced jobs; and
   a controller configured to manage the one or more consumer processors based on a condition of a bandwidth between a memory and the producer processors,
   wherein the controller determines a variation in length of a shared queue shared by the processors including calculating a moving average of the shared queue determined according to the number and specific time of jobs to be processed in the shared queue and manages the one or more consumer processors based on the variation in length of the shared queue.

2. The memory manager of claim 1, wherein the controller comprises:
   a bandwidth monitor configured to check the condition of the bandwidth between the memory and the producer processors.

3. The memory manager of claim 2, wherein the bandwidth monitor comprises:
   a queue monitor configured to check a length of a shared queue shared by the producer processors and the consumer processors, determined according to the number of jobs to be processed in the shared queue.

4. The memory manager of claim 2, wherein the bandwidth monitor comprises:
   a queue monitor configured to calculate the moving average of the shared queue shared by the producer processors and the consumer processors, determined according to the number and specific time of jobs to be processed in the shared queue.

5. The memory manager of claim 1, wherein the controller adjusts the number of consumer processors based on the condition of the bandwidth.

6. The memory manager of claim 5, wherein the controller comprises:
   a process adjustor configured to increase the number of consumer processors when a length of a shared queue is greater than a predetermined upper limit, and configured to decrease the number of consumer processors when the length of the shared queue is less than a predetermined lower limit.

7. The memory manager of claim 5, wherein the controller comprises:
   a process adjustor configured to decrease an assignment unit size of data to be consumed by the one or more consumer processors when a length of a shared queue is greater than a predetermined upper limit, and configured to increase the assignment unit size of data to be consumed by the one or more consumer processors when the length of the shared queue is less than a predetermined lower limit.

8. The memory manager of claim 5, wherein the controller comprises:
   a process adjustor configured to increase the number of consumer processors when a length of a shared queue continues to increase for a given period of time, and configured to decrease the number of consumer processors when the length of the shared queue continues to decrease for a given period of time.

9. The memory manager of claim 5, wherein the controller comprises:
   a process adjustor configured to decrease an assignment unit size of data to be consumed by the one or more consumer processors when a length of a shared queue continues to increase for a given period of time, and configured to increase the assignment unit size of data to be consumed by the one or more consumer processors when the length of the shared queue continues to decrease for a given period of time.

10. A memory managing method in a multi-processing environment comprising a producer process, a consumer process and a memory, the method comprising:
    checking a condition of a bandwidth between the memory and one or more producer processors assigned to the producer process and one or more consumer processors assigned to the consumer process; and
    managing the consumer process based on the condition of the bandwidth,
    wherein the checking condition of the bandwidth comprises determining of a variation in length of a shared queue including calculating a moving average of the shared queue determined according to the number and specific time of jobs to be processed in the shared queue, and
    wherein the managing the consumer process comprises managing the one or more consumer processors based on the variation in length of the shared queue.

11. The method of claim 10, wherein the checking of the condition of the bandwidth comprises determining a length of a shared queue shared by the producer process and the consumer process according to the number of jobs to be processed in the shared queue.

12. The method of claim 10, wherein the managing of the consumer process comprises adjusting the number of consumer processors assigned to the consumer process based on the condition of the bandwidth.

13. The method of claim 12, wherein:
the adjusting the number of consumer processors comprises increasing the number of consumer processors assigned to the consumer process when a length of a shared queue is greater than a predetermined upper limit, and decreasing the number of consumer processors assigned to the consumer process when the length of the shared queue is less than a predetermined lower limit.

14. The method of claim 12, wherein:
the adjusting the number of consumer processors comprises increasing the number of consumer processors assigned to the consumer process when a length of a shared queue continues to increase for a given period of time, and decreasing the number of consumer processors assigned to the consumer process when the length of the shared queue continues to decrease for a given period of time.

15. The method of claim 10, wherein:
the managing of the consumer process comprises decreasing an assignment unit size of data to be consumed by the consumer process when a length of a shared queue is greater than a predetermined upper limit, and increasing the assignment unit size of data to be consumed by the consumer process when the length of the shared queue is less than a predetermined lower limit.

16. The method of claim 10, wherein:
the managing of the consumer process comprises decreasing an assignment unit size of data to be consumed by the consumer process when a length of a shared queue continues to increase for a given period of time, and increasing the assignment unit size of data to be consumed by the consumer process when the length of the shared queue continues to decrease for a given period of time.

17. A non-transitory computing device for use in a multi-processing environment, comprising:
a shared queue shared by a first process configured to produce jobs and a second process configured to consume the jobs produced by the first process; and
a controller comprising a processor and configured to
determine a condition of a bandwidth between a memory and one or more processors assigned to the first process, based on a condition of the shared queue; and
manage the second process based on the determined condition of the bandwidth,
wherein the controller is configured to determine a variation in length of the shared queue including calculating a moving average of the shared queue determined according to the number and specific time of jobs to be processed in the shared queue, and to manage the second process based on the variation in length of the shared queue.

18. The non-transitory computing device of claim 17, wherein the controller adjusts a number of processors assigned to the second process based on the determined condition of the bandwidth.

19. The non-transitory computing device of claim 17, wherein the controller further comprises:
a queue monitor which checks a length of the shared queue, the length being determined according to the number of jobs to be processed in the shared queue.

20. The non-transitory computing device of claim 19, wherein the controller further comprises:
a process adjustor which increases a number of processors assigned to the second process when the length of the shared queue is greater than a predetermined upper limit, and decreases the number of processors assigned to the second process when the length of the shared queue is less than a predetermined lower limit.

21. The non-transitory computing device of claim 19, wherein the controller further comprises:
a process adjustor configured to decrease an assignment unit size of data to be consumed by the second process when the length of the shared queue is greater than a predetermined upper limit, and configured to increase the assignment unit size of data to be consumed by the second process when the length of the shared queue is less than a predetermined lower limit.

22. The non-transitory computing device of claim 17, wherein the controller further comprises:
a queue monitor configured to calculate a moving average of the shared queue, the moving average being determined according to the number and specific time of jobs to be processed in the shared queue.

23. The non-transitory computing device of claim 22, wherein the controller further comprises:
a process adjustor configured to increase a number of processors assigned to the second process when a length of the shared queue continues to increase for a given period of time, and configured to decrease the number of processors assigned to the second process when the length of the shared queue continues to decrease for a given period of time.

24. The non-transitory computing device of claim 22, wherein the controller further comprises:
a process adjustor configured to decrease an assignment unit size of data to be consumed by the second process when a length of the shared queue continues to increase for a given period of time, and configured to increase the assignment unit size of data to be consumed by the second process when the length of the shared queue continues to decrease for a given period of time.

25. A non-transitory computing device for use in a multi-processing environment, comprising:
a shared queue configured to be shared by a first process and a second process, wherein the first process produces data and entries of the shared queue are jobs to be processed by the second process; and
a controller comprising a processor and configured to
determine a condition of a bandwidth between a memory and one or more processors assigned to the first process, based on a condition of the shared queue; and
adjust a number of processors assigned to the second process and/or an assignment unit size of data to be processed by the second process based on the determined condition of the bandwidth,
wherein the controller is further configured to determine a variation in length of the shared queue including calculating a moving average of the shared queue determined according to the number and specific time of jobs to be processed in the shared queue and to adjust the number of processors assigned to the second process and/or the assignment unit size of data to be processed by the second process based on the variation in length of the shared queue.

26. The non-transitory computing device of claim 25, wherein the controller further comprises:
a queue monitor configured to check a length of the shared queue, the length being determined according to the number of jobs to be processed in the shared queue; and
a process adjustor configured to increase the number of processors assigned to the second process and/or configured to decrease the assignment unit size of data to be processed by the second process when the length of the shared queue is greater than a predetermined upper limit, and configured to decrease the number of processors assigned to the second process and/or configured to increase the assignment unit size of data to be processed by the second process when the length of the shared queue is less than a predetermined lower limit.

27. The non-transitory computing device of claim 25, wherein the controller increases the number of processors assigned to the second process and/or decreases the assignment unit size of data to be processed by the second process when a variation in length of the shared queue indicates an increasing trend, and decreases the number of processors assigned to the second process and/or increases the assignment unit size of data to be processed by the second process when the variation in length of the shared queue indicates a decreasing trend.

28. The non-transitory computing device of claim 25, wherein the controller adjusts the number of processors assigned to the second process by placing one or more of the processors assigned to the second process in a sleep mode.

29. A non-transitory computer-readable storage medium storing a program to manage a memory in a multi-processing environment, comprising instructions to cause a computer to:
    determine a variation in length of a shared queue which is shared by a first process and a second process including calculating a moving average of the shared queue determined according to the number and specific time of jobs to be processed in the shared queue, wherein the first process produces data and entries of the shared queue are jobs to be processed by the second process;
    determine a condition of a bandwidth between a memory and one or more processors assigned to the first process, based on the variation in length of the shared queue; and
    manage the second process based on the determined condition of the bandwidth.

30. The memory manager of claim 3, wherein the length of the shared queue varies depending on a rate of job production of a producer process and a rate of job consumption of a consumer process.

31. The memory manager of claim 1, wherein a number of consumer processors assigned to a consumer process depends on bandwidth saturation.

32. The memory manager of claim 6, wherein the upper limit and the lower limit are calculated with respect to a value indicating an optimal work performance.

33. The memory manager of claim 32, wherein the optimal work performance is obtained from testing various workloads.

34. The method of claim 10, further comprising adaptively adjusting the assignment or allocation of the consumer processors according to workload or properties of data used.

35. The non-transitory computing device of claim 19, wherein the determined condition of the bandwidth is oversaturation or under-saturation, and the condition of the shared queue is a length of the shared queue.

* * * * *